US009317300B1

(12) United States Patent
Kang (10) Patent No.: US 9,317,300 B1
(45) Date of Patent: *Apr. 19, 2016

(54) ASSISTING A BASIC INPUT/OUTPUT SYSTEM

(71) Applicant: Marvell International Ltd., Hamilton (BM)

(72) Inventor: Xinhai Kang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 325 days.

This patent is subject to a terminal disclaimer.

(21) Appl. No.: 13/898,205

(22) Filed: May 20, 2013

Related U.S. Application Data

(63) Continuation of application No. 12/254,482, filed on Oct. 20, 2008, now Pat. No. 8,458,687.

(60) Provisional application No. 60/981,976, filed on Oct. 23, 2007.

(51) Int. Cl.
*G06F 9/44* (2006.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| 6,317,798 | B1 | 11/2001 | Graf |
| 7,165,171 | B2 | 1/2007 | Zhang et al. |
| 7,191,328 | B2 | 3/2007 | Hobson |
| 7,240,190 | B2 * | 7/2007 | Lai ..................................... 713/2 |
| 7,420,544 | B2 * | 9/2008 | Ono et al. ...................... 345/172 |
| 7,506,148 | B2 | 3/2009 | Zhang et al. |
| 8,458,687 | B1 | 6/2013 | Kang |
| 9,032,376 | B2 * | 5/2015 | Boshernitsan et al. ........ 717/131 |
| 9,032,393 | B1 * | 5/2015 | Allen et al. .................... 717/177 |
| 9,037,994 | B2 * | 5/2015 | Advani .......................... 715/781 |
| 2004/0230790 | A1 * | 11/2004 | Zhang et al. ...................... 713/2 |
| 2004/0243385 | A1 | 12/2004 | Rothman et al. |
| 2005/0055566 | A1 * | 3/2005 | Huang et al. ................... 713/200 |
| 2006/0015776 | A1 * | 1/2006 | Lee ................................. 714/30 |
| 2006/0090032 | A1 * | 4/2006 | Franklin et al. ............... 711/114 |
| 2006/0242202 | A1 * | 10/2006 | Li ............................... 707/104.1 |
| 2006/0282633 | A1 * | 12/2006 | Iwai ....................... G06F 21/575 711/163 |
| 2008/0065767 | A1 | 3/2008 | Stachura et al. |
| 2010/0271388 | A1 * | 10/2010 | Gillespie ............... G06F 9/4443 345/592 |

FOREIGN PATENT DOCUMENTS

TW 552499 9/2003

OTHER PUBLICATIONS

"Non-Final Office Action", U.S. Appl. No. 12/254,482, Sep. 28, 2012, 17 pages.
"Notice of Allowance", U.S. Appl. No. 12/254,482, Feb. 1, 2013, 12 pages.
"Restriction Requirement", U.S. Appl. No. 12/254,482, Jun. 20, 2012, 6 pages.

* cited by examiner

*Primary Examiner* — Wei Zhen
*Assistant Examiner* — Daxin Wu (57) ABSTRACT

In one or more embodiments, system(s), method(s), integrated circuit(s), physical layer(s), apparatus(es), System-on-Chip (SoC), various other hardware, computer-readable and/or executable instructions, and/or technique(s) are described that assist a host BIOS, such as by offloading operations from the host BIOS to a remote entity. By so doing, a BIOS's resources may be conserved or more complex or resource-intensive tasks may be performed than may otherwise be possible for some traditional BIOS.

20 Claims, 6 Drawing Sheets

ASSISTING A BASIC INPUT/OUTPUT SYSTEM

RELATED APPLICATION

This application claims is a continuation of and claims priority to U.S. patent application Ser. No. 12/254,482 filed Oct. 20, 2008 which in turn claims priority to U.S. Provisional Patent Application Ser. No. 60/981,976 filed Oct. 23, 2007, the disclosures of which are incorporated by reference herein in their entirety.

BACKGROUND

Many computing devices currently use traditional Basic Input/Output Systems. These basic input/output systems, also called BIOS, are firmware code run by a computing device when first powered on. The BIOS is primarily directed to identifying and initializing system component hardware, such as video-display cards and memory, to name a few. By so doing the BIOS prepares the computing device to operate in a known, low-capability state so that software programs stored on various media can be loaded, executed, and given control of the computing device.

These traditional BIOS, however, have significant limitations. These limitations include 16-bit segmented addressing, code mixing (typically assembly and "C" code), significant difficulties in being developed or debugged, and/or limited resources for data and code. These limited resources can make it difficult for a BIOS to perform even moderately complex operations or those having moderate memory requirements.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In a first method embodiment, a method is described including constructing user interface instructions sufficient to enable a host BIOS to present a user interface based on the user interface instructions and passing these instructions to the host BIOS. The method also includes receiving wrapped user input received through a user interface presented by the host BIOS and based on the user interface instructions. The method may then perform one or more operations based on the wrapped user input effective to provide other instructions to the host BIOS and pass these other instructions to the host BIOS.

In a second method embodiment, a method is described including receiving user interface instructions from an entity remote from a host BIOS, the user interface instructions sufficient to enable the host BIOS to present a user interface based on the user interface instructions and then presenting a user interface based on these user interface instructions. The method may also receive user input through the user interface, wrap this user input, and pass the wrapped user input to the entity. The method may then receive other instructions from the entity, the other instructions sufficient to enable the host BIOS to alter the user interface based on the other instructions or build a new user interface based on the other instructions, after which the method alters the user interface or builds a new user interface based on the other instructions.

In a third method embodiment, a method is described that determines one or more operations that may tax memory or processing resources of a host BIOS and requests that the operations be performed by a remote entity. The method may also receive results of the operations having been performed by the remote entity and use the results effective to conserve the memory or processing resources of the host BIOS.

In a fourth method embodiment, a method is described that receives a request to perform an operation from a host BIOS, the operation being a part of performing a larger task, and performing the operation to produce results. The method passes the results to the host BIOS effective to enable the host BIOS to perform the larger task using fewer memory or processing resources than if the host BIOS performed the larger task without the results.

In a first apparatus embodiment, an apparatus for assisting a BIOS includes microprocessor(s), computer-readable media, and a BIOS assistance module. The BIOS assistance module is stored on the media and has instructions that may be executed by the microprocessor(s). When executed, the instructions are capable of receiving a request to perform an operation from a host BIOS, the operation being a part of performing a larger task, performing the operation to produce results, and passing the results to the host BIOS effective to enable the host BIOS to perform the larger task using fewer memory or processing resources than if the host BIOS performed the larger task without the results.

In a second apparatus embodiment, an apparatus for assisting a BIOS includes microprocessor(s), computer-readable media, and a BIOS assistance module. The BIOS assistance module is stored on the media and has instructions that may be executed by the microprocessor(s). When executed, the instructions are capable of constructing user interface instructions sufficient to enable a host BIOS to present a user interface based on the user interface instructions and passing the user interface instructions to the host BIOS. The instructions are also capable of receiving wrapped user input received through a user interface presented by the host BIOS and based on the user interface instructions. Based on the received wrapped user input, the instructions are also capable of performing one or more operations based on the wrapped user input effective to provide other instructions to the host BIOS, the other instructions sufficient to enable the host BIOS to alter the user interface or build a new user interface. The other instructions may then be passed to the host BIOS.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As noted generally in the Background above, BIOS perform initial tasks. This document focuses on those tasks having at least one component operation that may tax the resources of the BIOS. These tasks include, by way of example only, constructing BIOS Boot Specification (BBS) PnP (Plug-And-Play) headers, handling INT13h functions, and providing a user interface by which a user may manage the BIOS.

This document describes tools that offload some operations from a host BIOS to an entity remote from the host BIOS. By so doing, the tools may permit complex and/or memory-intensive tasks that would otherwise be difficult or impossible for some traditional BIOS to perform. For example, many current host BIOS are unable to perform fairly simple user interfaces because they lack memory, traffic bandwidth, processing, or other resources.

In one embodiment, the tools construct a user interface in firmware and then send information to the host BIOS for the host BIOS to render. In effect, the host BIOS is enabled to act like a dummy terminal. The host BIOS presents the user interface and, once a user inputs one or more characters, wraps those characters and pushes them back to the firmware. This requires very few resources of the host BIOS. The user interface task now takes relatively few resources of the host BIOS because resource-intensive operations of the user interface task are offloaded to the firmware.

In the discussion that follows, an example operating environment is described that may incorporate, represent, or be used by the tools. The tools may include the example module(s) and other elements described in this environment of FIG. 1. Example procedures are also described that may be employed in the example operating environment as well as other environments. These procedures are followed by an example System-on-Chip (SoC) embodiment in which components of FIG. 1 may be embodied. In the discussion below, reference will be made to the environment by way of example only. Therefore, implementation of the tools is not limited to the example environment. The term "tools" as used herein may refer to system(s), method(s), integrated circuit(s), firmware, apparatus(es), physical layer(s), SoCs, various other hardware, computer-readable and/or executable instructions, and/or technique(s) as permitted by the context above and throughout the document.

Example Operating Environment

Before describing the tools in detail, the following discussion of an example operating environment is provided to assist the reader in understanding some ways in which various aspects of the tools may be, but are not required to be, employed. The environment described below constitutes one example; other environments may be used without departing from the spirit and scope of the claimed subject matter.

Figure 1:
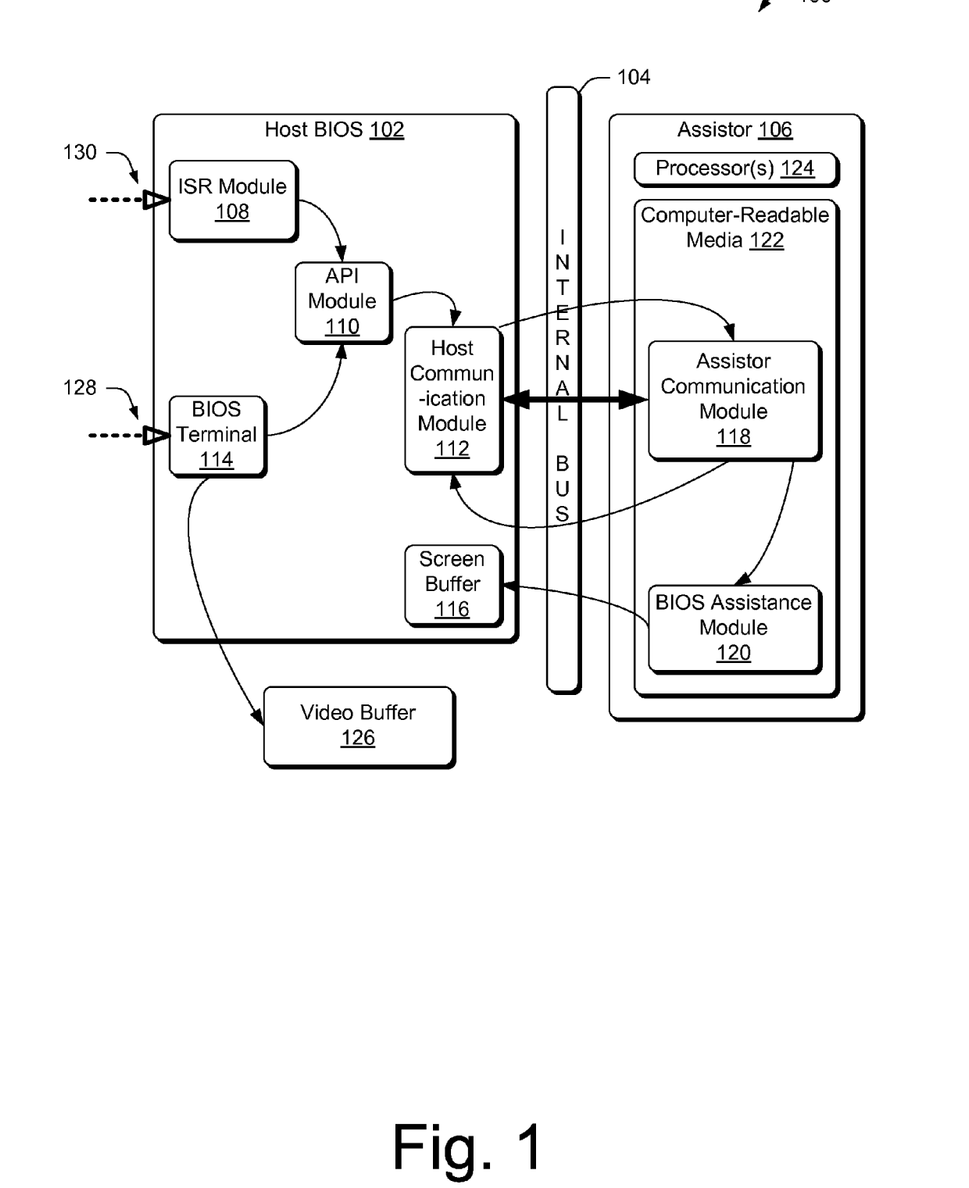
FIG. 1 is an illustration of an example operating environment that is configured to assist a host BIOS.

FIG. 1 illustrates one such operating environment 100. The example operating environment includes a host BIOS 102, an internal bus 104, and assistor 106. The assistor is an entity remote from the host BIOS in that it does not use memory or processing resources of the host BIOS to perform its operations. Rather, it acts to offload operations of the host BIOS by doing them for the host BIOS. In this example, the assistor uses its own memory and processing resources and communicates with the host BIOS through internal bus 104.

The host BIOS includes an integrated service router (ISR) module 108, an Application Program Interface (API) module 110, a host communication module 112, a BIOS terminal 114, and a screen buffer 116.

The internal bus enables communication between the host BIOS and the assistor and may be one of many types of busses, such as a fast internal bus like a PCI Express™ bus. This communication is shown through assistor communication module 118, which is integrated into assistor 106, and the host communication module. The assistor also includes a BIOS assistance module 120. The BIOS assistance module communicates through the internal bus to the screen buffer in the host BIOS. Note that the assistor modules 118 and 120 may operate in hardware, software, firmware, or otherwise. Here they are shown stored in computer-readable media 122 having instructions executable by processor(s) 124, though other manners are also contemplated.

Also shown is a video buffer 126, which receives renderable data from the BIOS terminal effective to show a user interface (based on instructions provided by assistor 106). User input (shown at arrow 128) is made through the user interface presented by the video buffer and is received by the BIOS terminal. The BIOS terminal packages the characters input by the user, which are then passed through the API module to the host communication module. The host communication module passes the information through the internal bus to the assistor communication module, which is then passed to the BIOS assistance module.

The BIOS assistance module, as described in greater detail below, is capable of performing operations that may tax the resources of the host BIOS if performed by the host BIOS. The BIOS assistance module may provide instructions by which the host BIOS may render a user interface and operations performed based on the input received from a user through the user interface. These operations are performed effective to offload resource-intensive operations from the host BIOS.

This is but one example of ways in which the BIOS assistance module may act to offload operations that are complex or memory intensive from the host BIOS. Other operations may also be performed. For example, current host BIOS often need to pack different message payloads for different ISR functions (e.g., INT13h). The tools, here through the BIOS assistance module, may handle INT13h register interfaces thereby permitting a BIOS to pack the registers into a predefined message payload and pass it to the assistor rather than perform these operations itself.

Further, the tools, in some embodiments, enable the API module in the BIOS to be simplified because it is no longer necessary for the host BIOS to handle so many management interfaces as are currently often required of it. Data received into ISR module 108 (shown at arrow 130) may be handled by the assistor rather than the BIOS or any of its component elements (e.g., API module 110). For example, the BIOS assistance module may handle information received through the ISR module sufficient to ease the resource load on the host BIOS, such as by performing calculations and/or storing information. After handling the information (e.g., by performing operations based on the information) the BIOS assistance module passes the results to the host BIOS through the assistor communication module and the internal bus to the host communication module.

The tools, here including or acting through the modules and elements of the host BIOS and/or assistor, enable the host BIOS to conserve memory and processing resources. As noted above, this conservation of resources not only helps the host BIOS but may also enable more tasks and more-complex tasks having at least one resource-intensive operation. In some cases it may also enable a BIOS to be designed less expensively that current BIOS.

Example Procedures

The following discussion describes techniques that may be implemented utilizing the previously described environment. Aspects of the procedure may be implemented in hardware, firmware, software, or a combination thereof. The procedures are shown as a set of blocks that specify operations performed by one or more entities and are not necessarily limited to the orders shown for performing the operations by the respective blocks.

Figure 2:
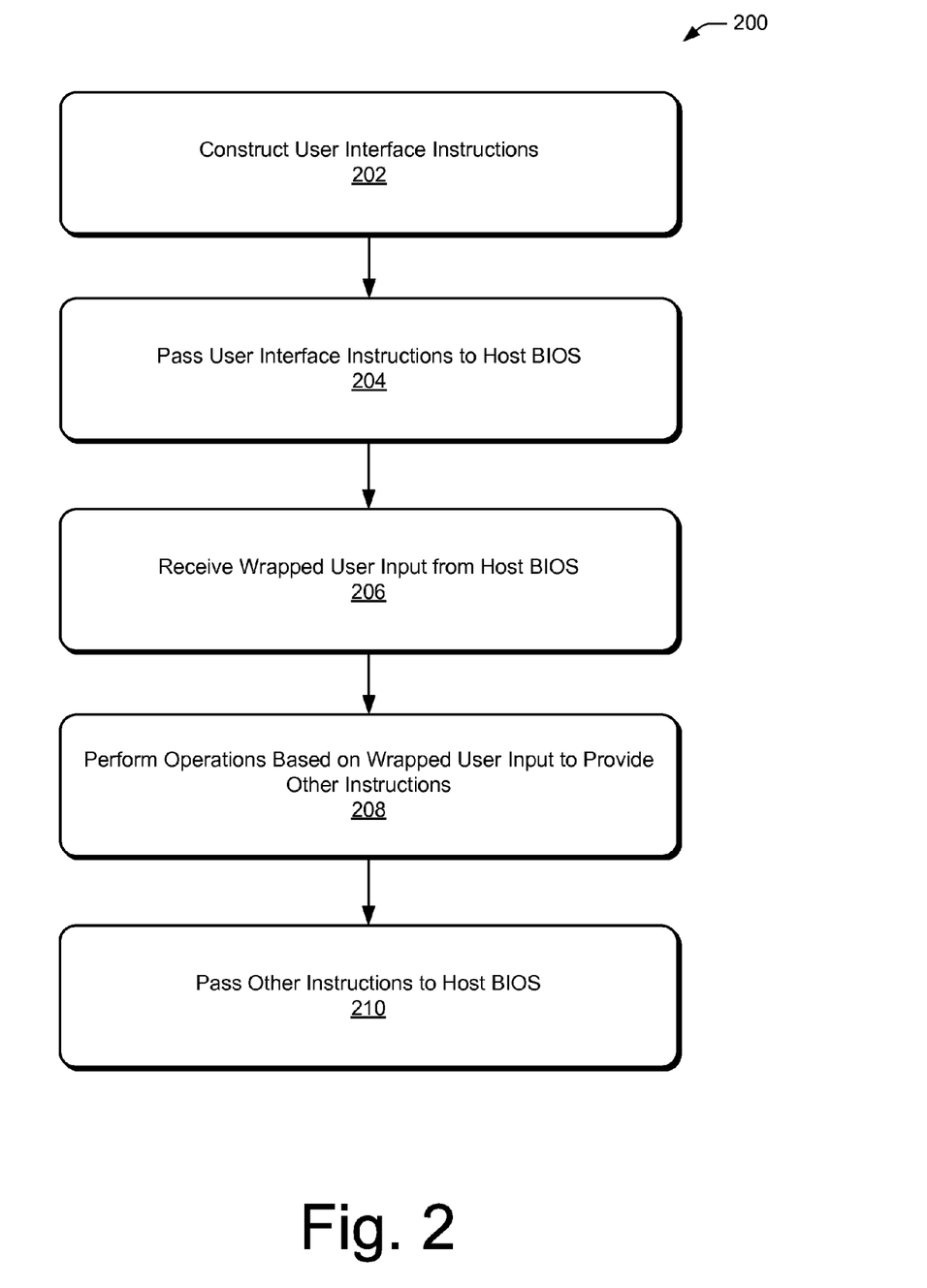
FIG. 2 is a flow diagram that depicts an example procedure in which tools assist a BIOS with a user interface.

FIG. 2 depicts a procedure 200 in an example implementation in which the tools assist a BIOS with a user interface task.

At block 202 the tools construct user interface instructions. The tools construct the user interface instructions sufficient to enable a host BIOS to present the user interface using fewer resources than were the host BIOS to construct the user interface or instructions for it on its own. In some embodiments, the user interface instructions built by the tools enables the host BIOS to act as a dummy terminal. Acting as a dummy terminal, in many cases, takes very few resources. Constructing the user interface instructions may include compiling information about the computing device on which the host BIOS operates, such as device information about the device's display, video card, or other hardware. With this information the tools may construct instructions that require very few resources to present the user interface.

As shown in the example environment 100 of FIG. 1, the tools may act through assistor 106 and its component elements. Thus, BIOS assistance module 120 may find information about the computing device on which the host BIOS is operating and, using this information, build instructions that require few resources to present a user interface through which a user may manage the host BIOS. By so doing, the host BIOS may use less memory and/or processing resources than if the host BIOS constructed these user interface instructions without help from the assistor. Furthermore, a host BIOS may be built more simply or less expensively if it does not need to perform some of the tasks performed by assistor 106.

At block 204 the tools pass the user interface instructions to the host BIOS. This may be performed through assistor communication module 118, internal bus 104, and host communication module 112. The host BIOS receives these user interface instructions and passes back wrapped user input. Actions by the host BIOS are set forth in greater detail as part of process 300 of FIG. 3. As such, this discussion remains at process 200 and will cover other actions performable by the tools as part of process 300.

Figure 3:
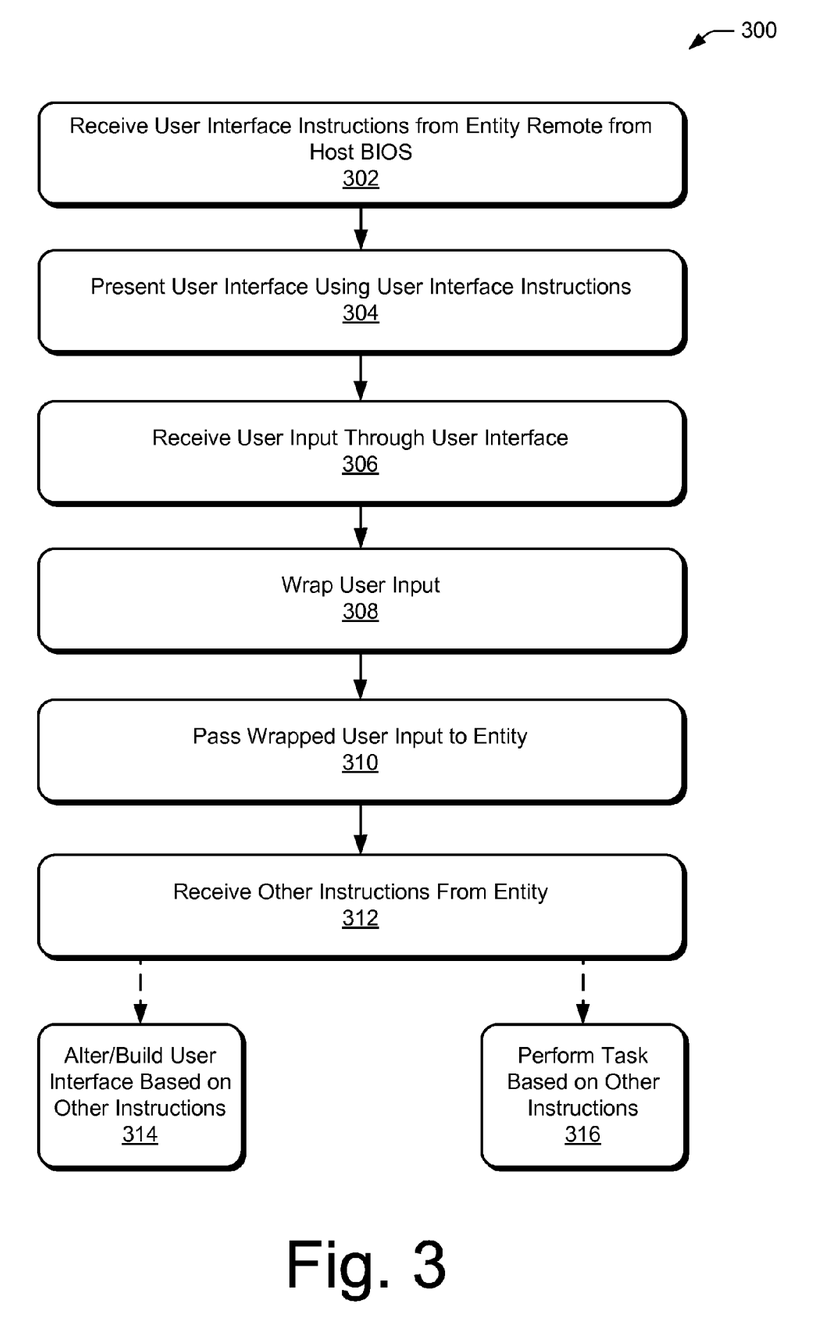
FIG. 3 is a flow diagram that depicts an example procedure in which a host BIOS acts in cooperation with an entity remote from the host BIOS and assisting the host BIOS with a user interface.

At block 206 the tools receive wrapped user input from the host BIOS. As will be discussed in greater detail as part of process 300, this wrapped user input may be as simple as text characters entered by a user into a user interface presented by the host BIOS based on the user interface instructions passed to the host BIOS at block 204.

At block 208 the tools perform operations based on the wrapped user input to provide other instructions to the host BIOS. This wrapped user input, for example, may include textual characters requesting a task for the host BIOS to perform. The tools may make it easier for the host BIOS to perform the requested task by using memory and processing resources of assistor 106.

In some cases, the wrapped user input indicates a selection by the user to manage the host BIOS. In these cases the tools may first determine a task selected for the host BIOS to perform based on the wrapped user input before performing the operations at block 208. With this determined, the tools at block 208 may then perform one or more operations to further completion of the task.

Additionally or alternatively, the wrapped user input may necessitate a change to the user interface. In such a case, the operations performed at block 208 will result in user interface instructions to alter the current presentation of the user interface. They may also result in new user interface instructions usable to build a new presentation of the user interface.

At block 210 the tools pass these other instructions to the host BIOS. As will be discussed as part of process 300, the host BIOS may use these instructions to present or alter a user interface or perform a task using less memory or processing power than were the instructions not received by the host BIOS.

FIG. 3 depicts another procedure 300 in an example implementation in which the host BIOS receives assistance from an entity remote from the host BIOS, such as assistor 106. With this assistance the host BIOS may use fewer memory and processing resources.

At block 302 the tools receive user interface instructions from an entity remote form a host BIOS, such as assistor 106 of FIG. 1. The entity is remote at least in the sense that it does not use memory resources of the host BIOS. In the above examples the remote entity may be assistor 106, which may be part of or work in conjunction with firmware, another form of controller, or otherwise. As noted above, these user interface instructions are sufficient to permit the host BIOS to present a user interface using fewer processing resources or memory than were the host BIOS to perform operations to construct these user interface instructions itself.

At block 304 the tools present a user interface based on the user interface instructions. In one embodiment, the host BIOS receives the instructions from assistor communication module 118 through internal bus 104 to host communication module 112. With these user interface instructions, the host BIOS uses screen buffer 116, video buffer 126, and BIOS terminal 114 to present a user interface through which a user may enter input. This user interface may be intended for a user to manage the host BIOS or for other purposes.

At block 306 the tools receive user input from the user interface. By way of example, consider FIG. 1. Here user input 128 is received through BIOS terminal 114.

At block 308 the tools wrap the received user input. Wrapping user input is a relatively low cost operation. At block 310 the host BIOS passes the wrapped user input to the entity remote from the host BIOS (e.g., assistor 106). Thus, with few resources the host BIOS receives, wraps, and passes user input. Compared to constructing a user interface in the host BIOS these are very low-cost operations. In response to receiving the wrapped user input, the tools may proceed as set forth in process 200.

At block 312 the tools receive other instructions from the remote entity. These instructions may indicate that the host BIOS is to alter the user interface or build a new user interface based on the other instructions. The tools at block 314 alter or present the user interface based on the other instructions. Note that the other instructions are provided responsive to the wrapped user input passed to the remote entity. These other instructions may require operations to be performed that also tax the resources of the host BIOS. In this further way the remote entity (e.g., assistor 106) may offload operations to conserve resources of the host BIOS.

Alternatively or additionally, these instructions may indicate that a task should be performed by the host BIOS. These instructions, in either case, result from a remote entity having performed operations using memory and/or processing resources other than those of the host BIOS. Therefore, these instructions are sufficient to enable the host BIOS to perform the task (or alter/build the user interface) with fewer memory or processing resources.

Process 200 and process 300 provide example actions regarding a user interface that enable the host BIOS to use fewer memory or processing resources. Other example actions are also performable by the tools and are described using process 400 and process 500 below.

Figure 4:
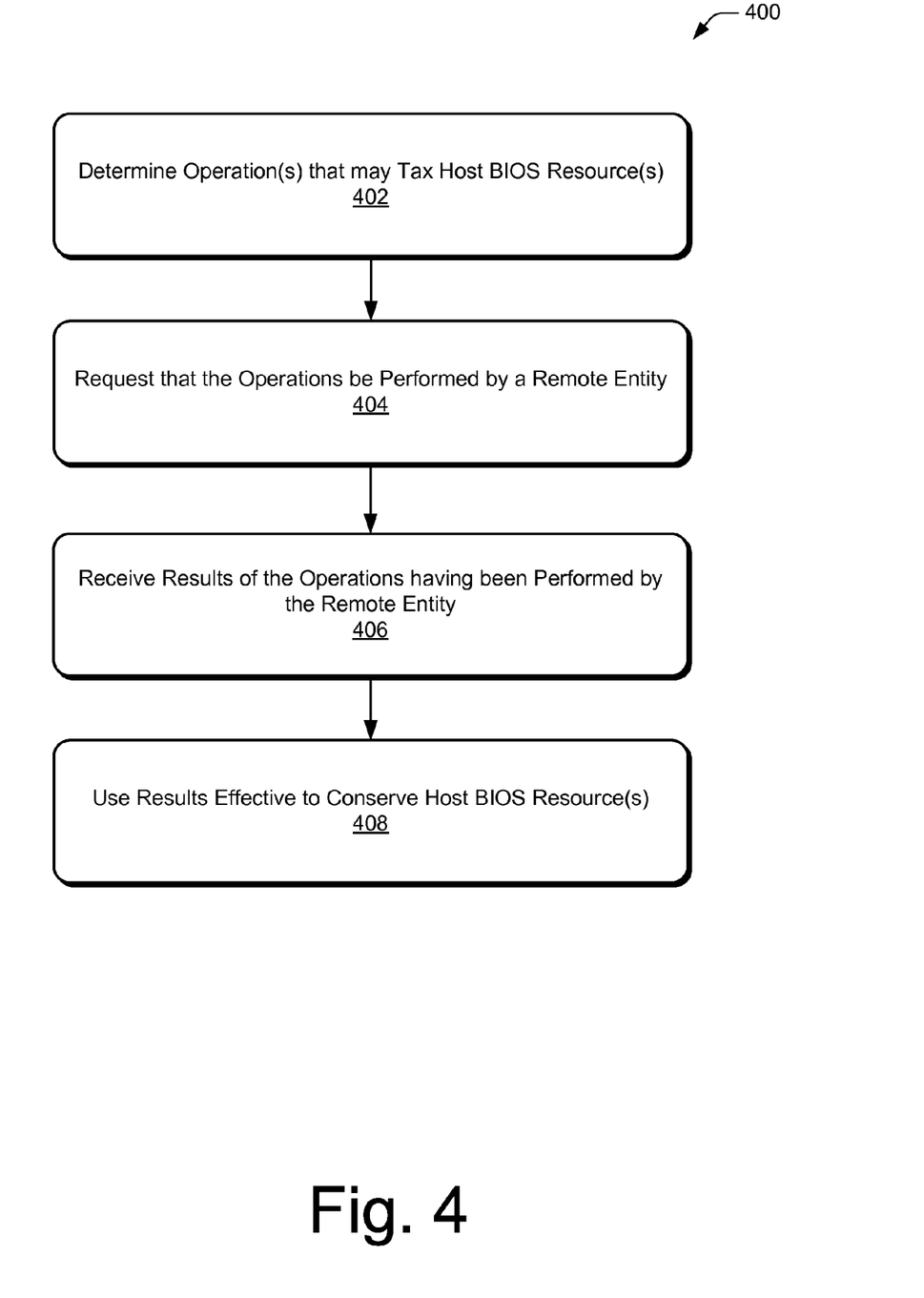
FIG. 4 is a flow diagram that depicts an example procedure in which tools assist a BIOS with a task by performing an operation that is part of completing that task.

At block 402 the tools determine operations that may tax a host BIOS's resources. Many tasks include operations that tax memory or processing resources of the host BIOS. To complete the task, a host BIOS may perform these operations, but doing so taxes the host BIOS resources.

There are many such tasks typically performed by a host BIOS. These tasks include, for example, constructing BBS PnP headers and handling INT13h. Constructing BBS PnP headers often requires a host BIOS to know information about devices attached to the computing device on which that host BIOS is operating. Handling INT13h often requires a host BIOS to parse register definitions of INT13h functions and translate these into predefined message payloads.

At block 404 the tools request that the operations be performed remotely, such as by a remote entity. This request may indicate the operation to be performed and may also comprise information sufficient for the remote entity to perform the requested operations along with the remote entity's own information or information accessed based on the request.

This request, for example, may ask for operations to handle INT13h, including parsing register definitions and translating these into predefined message payloads. The host BIOS may pass this request or information in a format that is acceptable and/or not resource-intensive for the host BIOS to handle, such as in x86 registers. By so doing, the host BIOS may spend few resources in passing the information and fewer overall resources in performing the task of which the operations are a part.

At block 406 the tools receive results of operations having been performed, such as from and by a remote entity. These results may be produced along with other actions described as part of process 500 in FIG. 5. These results are sufficient for the host BIOS to perform tasks using fewer resources. They may also be received in a format easily usable by the host BIOS such as x86 registers.

At block 408 the tools use the results effective to conserve host BIOS resource(s). Continuing the ongoing examples, assistor 106, using BIOS assistance module 120, receives a request to construct BBS PnP headers or parse and translate as part of handling INT13h. Assistor 106 then provides these results, which the host BIOS receives at block 406. These results enable the host BIOS to use fewer resources as part of the task of constructing BBS PnP headers or handling INT13h, respectively.

Figure 5:
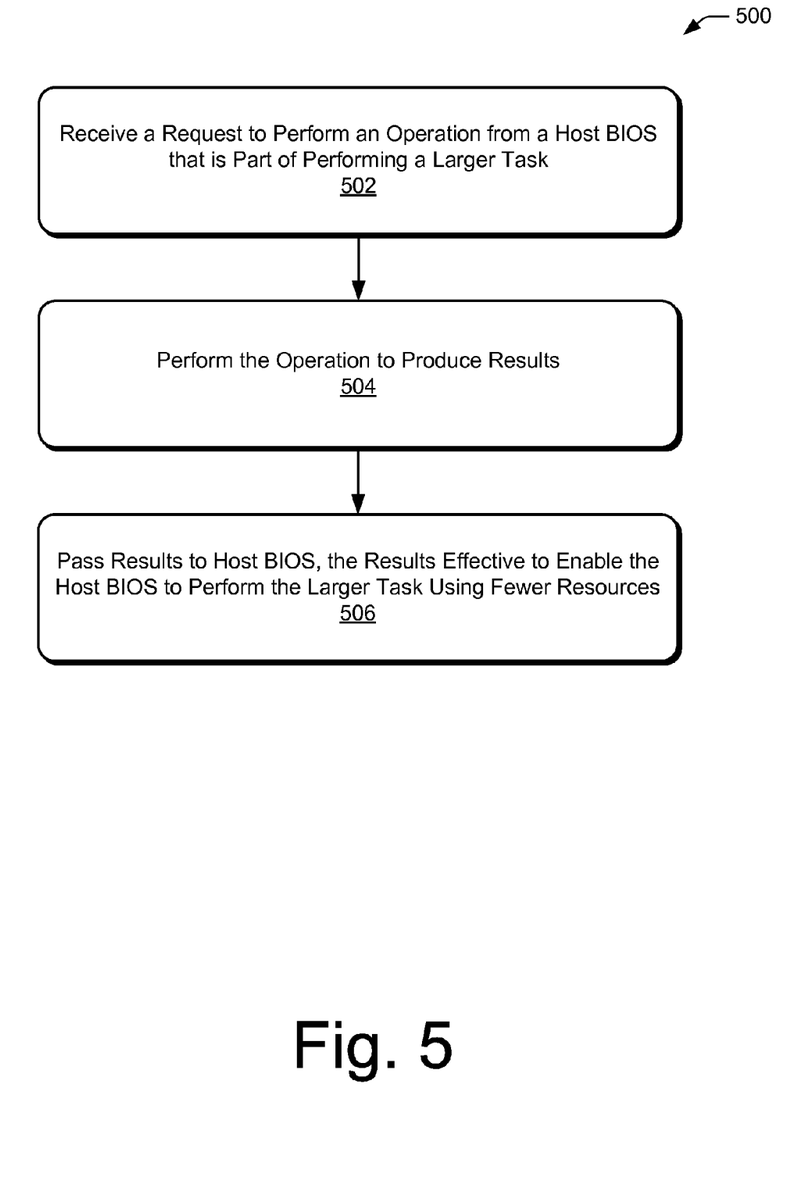
FIG. 5 is a flow diagram that depicts an example procedure in which a host BIOS acts in cooperation with an entity remote from the host BIOS and assisting the host BIOS with operations that are part of completing a task.

Process 500, as shown in FIG. 5, shows actions of a remote entity, such as assistor 106 of FIG. 1. Process 500 may be used in conjunction with or separate from those of process 400 described above.

At block 502 the tools receive a request to perform an operation from a host BIOS, the operation being a part of performing a larger task. As noted above, this request can be concerned with operations that may tax the host BIOS memory or processing resources. In the ongoing examples of BBS PnP headers and INT13h, the request includes information sufficient for a remote entity (e.g., assistor 106) to help the host BIOS perform the larger task of which the operation is a part. These instructions may be received in x86 registers from the host BIOS or otherwise.

At block 504 the tools perform the operation and produces results. For the ongoing example of the larger task of handling INT13h, assistor 106 may register interfaces thereby enabling the host BIOS to simply pack the registers into predefined message payloads and pass it to assistor 106. The host BIOS in this case no longer packs different message payloads for different INT13h functions. This saves the host BIOS resources. In some cases, the host BIOS may even be able to have a much simpler API module because of the assistance provided by assistor 106.

At block 506 the tools pass the results to the host BIOS, the results effective to enable the host BIOS to perform the larger task using fewer resources. The host BIOS proceeds to perform the larger task that the performed operations contributed to (at process 400). The tools at block 506 may pass these results in a format easily usable by the host BIOS, such as in x86 registers. Examples of actions by the host BIOS are set forth above and in particular per process 400 in FIG. 4.

The above processes described general and example actions by the tools, such as assistor 106 and elements of host BIOS 102. Some specific manners in which the tools may operate are set forth below.

For example, once the BIOS communication module and the assistor communication module establish communications, such as through a standard handshake procedure, the host BIOS may use current defined interfaces to communicate with assistor 106. There are other commands and interfaces that may also be used. One such command follows a generic command format set forth below.

| | | | | Bit | | | | |
|---|---|---|---|---|---|---|---|---|
| Byte | 7 | 6 | 5 | 4 | 3 | 2 | 1 | 0 |
| 0 | OPERATION CODE (SCSI_CMD_SPECIFIC, E1h) | | | | | | | |
| 1 | CDB_BIOS_MODULE (10h) | | | | | | | |
| 2 | SUB OPERATION CODE | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | ZERO | | | | | | | |

Another format may be used for key input and INT13h input. The key input command enables the BIOS terminal (e.g., BIOS terminal 114 of FIG. 1) to send a user key press to the assistor (e.g., the BIOS assistance module 120 of assistor 106). This key input command contains a frame that is a combination of INT16h, where AH=00h and AH=002h for the commands (GET KEYSTROKE) and (GET SHIFT FLAGS), respectively.

| Byte | Bit 7 | 6 | 5 | 4 | 3 | 2 | 1 | 0 |
|---|---|---|---|---|---|---|---|---|
| 0 | OPERATION CODE (SCSI_CMD_SPECIFIC, E1h) | | | | | | | |
| 1 | CDB_BIOS_MODULE (10h) | | | | | | | |
| 2 | SUB OPERATION CODE (01h) | | | | | | | |
| 3 | BIOS SCAN CODE | | | | | | | |
| 4 | ASCII CHARACTER | | | | | | | |
| 5 | INSERT | CAPS LOCK | NUM LOCK | SCR LOCK | ALT | CTRL | LEFT SHIFT | RIGHT SHIFT |
| 6 | | | | | | | | |
| 7 | | | | | | | | |
| 8 | | | | | | | | |
| 9 | ZERO | | | | | | | |

The INT13h input command enables the host BIOS to pass an INT13h request to the BIOS assistance module. An example of this command is set forth below.

| Byte | Bit 7 | 6 | 5 | 4 | 3 | 2 | 1 | 0 |
|---|---|---|---|---|---|---|---|---|
| 0 | OPERATION CODE (SCSI_CMD_SPECIFIC, E1h) | | | | | | | |
| 1 | CDB_BIOS_MODULE (10h) | | | | | | | |
| 2 | SUB OPERATION CODE (02h) | | | | | | | |
| 3 | Reserved | | | | | | | |
| 4 | X86 REGISTERS LOCATION | | | | | | | |
| 5 | | | | | | | | |
| 6 | | | | | | | | |
| 7 | | | | | | | | |
| 8 | | | | | | | | |
| 9 | ZERO | | | | | | | |

As noted above, x86 registers represent one format that may be used by the host BIOS. These registers may include a 32-bit pointer to host BIOS memory that points to a buffer that contains a general-purpose registers and four segment registers. An example of these registers is set forth below.

```
typedef struct_X86_REGS
{
    MV_U16      ax;
    MV_U16      bx;
    MV_U16      cx;
    MV_U16      dx;
    MV_U16      si;
    MV_U16      di;
    MV_U16      bp;
    MV_U16      sp;
    MV_U16      cs;
    MV_U16      ds;
    MV_U16      es;
    MV_U16      ss;
}X86_REGS;
```

A data buffer is not necessarily needed, though it may be used to buffer addresses by input registers. When returned, the register set, including the flags, can be returned in the outbound payload, which is defined in part below.

A BIOS TERMINAL INTERLEAVE COMMAND may be used in a format that notifies the assistor or other remote entity that the host BIOS intends to connect or disconnect from the assistor. This interleave command is set forth below.

| Byte | Bit 7 | 6 | 5 | 4 | 3 | 2 | 1 | 0 |
|---|---|---|---|---|---|---|---|---|
| 0 | OPERATION CODE (SCSI_CMD_SPECIFIC, E1h) | | | | | | | |
| 1 | CDB_BIOS_MODULE (10h) | | | | | | | |
| 2 | SUB OPERATION CODE(03h) | | | | | | | |
| 3 | | | | | | | | ENTER |
| 4 | SCREEN BUFFER LOCATION | | | | | | | |
| 5 | | | | | | | | |
| 6 | | | | | | | | |
| 7 | | | | | | | | |
| 8 | | | | | | | | |
| 9 | ZERO | | | | | | | |

If the ENTER bit is set to one, the host BIOS specifies a SCREEN BUFFER LOCATION. This SCREEN BUFFER LOCATION is here a 32-bit pointer that points to the BIOS host memory where the example 4 kilobyte screen buffer is located. If, on the other hand, the ENTER bit is set to zero, the assistor will not have access to the screen buffer (e.g., screen buffer 116 with access shown via an arrow between BIOS assistance module 120 and the buffer).

A GET PNP DEVICE INFO command may be used by which the host BIOS may gain device information (through the assistance of a remote entity) in order to construct a PnP header. One such example command with the below format is provided below.

| Byte | Bit 7 | 6 | 5 | 4 | 3 | 2 | 1 | 0 |
|---|---|---|---|---|---|---|---|---|
| 0 | OPERATION CODE (SCSI_CMD_SPECIFIC, E1h) | | | | | | | |
| 1 | CDB_BIOS_MODULE (10h) | | | | | | | |
| 2 | SUB OPERATION CODE (04h) | | | | | | | |
| 3 | INDEX | | | | | | | |
| 4 | PNP DEVICE INFO BUFFER LOCATION | | | | | | | |
| 5 | | | | | | | | |
| 6 | | | | | | | | |
| 7 | | | | | | | | |
| 8 | | | | | | | | |
| 9 | ZERO | | | | | | | |

The PNP DEVICE INFO BUFFER LOCATION is a 32-bit pointer to the host BIOS memory. It points to a structure as shown below.

```
typedef struct_PNP_DEVICE_INFO
{
    MV_U8    DeviceType : 2;    // 0 for None, 1 for HD, 2 for ATAPI, 3
                                    is reserved
```

-continued

```
MV_U8      Emulation : 2;       // ATAPI only, 0 for non, 1 for floppy, 2
                                 for HD 3 is reserved
MV_U8      Reserved1 : 4;
MV_U8      ControllerID;        // BIOS can use it, firmware won't
                                 touch
MV_U16     DeviceID;            // internal device id
MV_U8      ProductName [ . . . ];
} PNP_DEVICE_INFO;
```

The host BIOS may use this command to enumerate devices on the assistor. With this, PnP headers can be constructed using this information.

Another example command is the SET DEVICE DRIVER NUMBER command. This command enables the host BIOS to assign a drive number to a device that is connected to the computing device on which the host BIOS is operating. An example of this command is set forth below.

| Byte | Bit |||||||| |
|---|---|---|---|---|---|---|---|---|
| | 7 | 6 | 5 | 4 | 3 | 2 | 1 | 0 |
| 0 | OPERATION CODE (SCSI_CMD_SPECIFIC, E1h) |||||||| |
| 1 | CDB_BIOS_MODULE (10h) |||||||| |
| 2 | SUB OPERATION CODE (05h) |||||||| |
| 3 | ASSIGNED DRIVE NUMBER |||||||| |
| 4 | DEVICE ID |||||||| |
| 5 | | | | | | | | |
| 6 | | | | | | | | |
| 7 | | | | | | | | |
| 8 | | | | | | | | |
| 9 | ZERO |||||||| |

System-on-Chip Example

Figure 6:
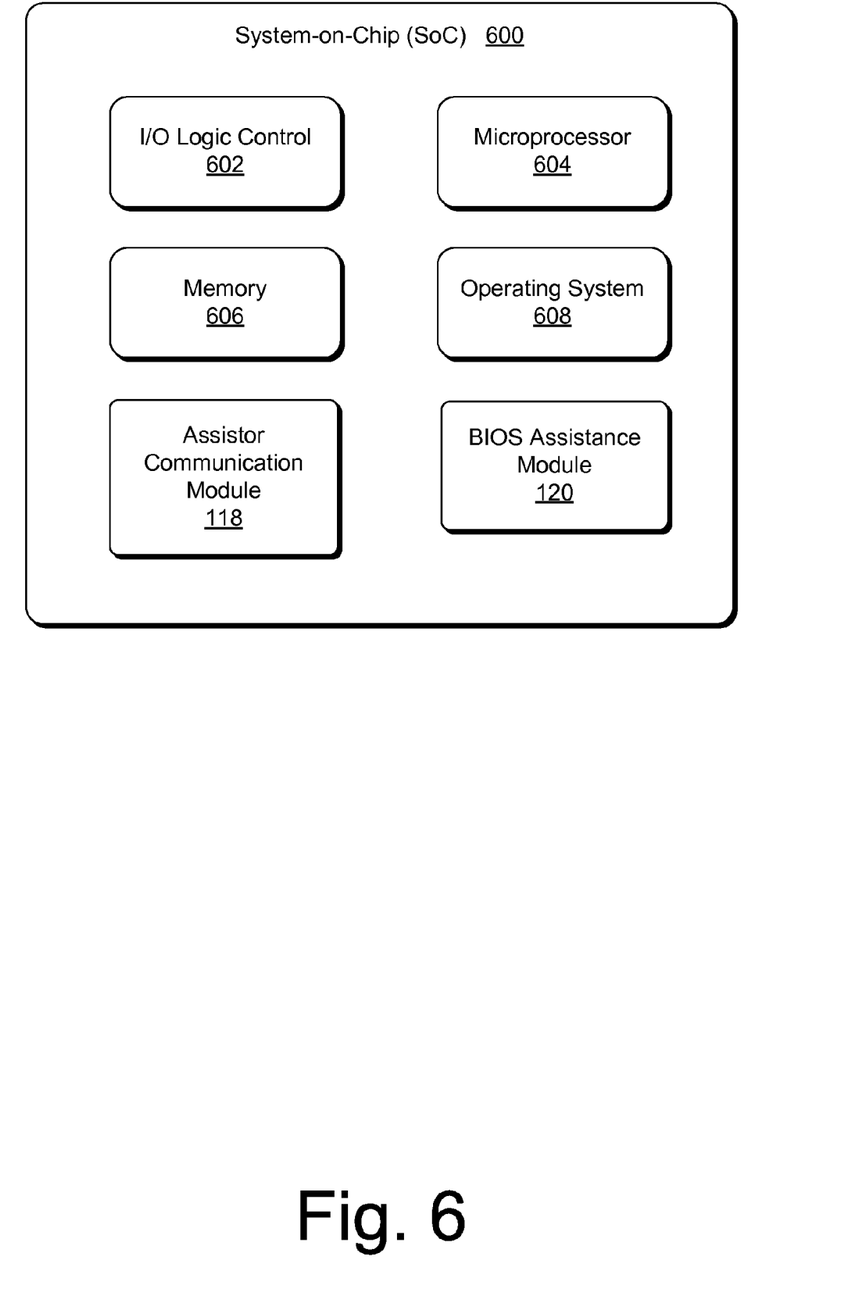
FIG. 6 illustrates an example system-on-chip (SoC) environment in which embodiments of the tools can be implemented.

FIG. 6 illustrates an example System-on-Chip (SoC) 600, which can implement various embodiments of the tools. An SoC can be implemented in a fixed or mobile computing device, such as any one or combination of a media device, computer device, television set-top box, video processing and/or rendering device, appliance device, gaming device, electronic device, vehicle, workstation, and/or in any other type of device that may use a BIOS.

The SoC 600 can be integrated with electronic circuitry, a microprocessor, memory, input-output (I/O) logic control, communication interfaces and components, other hardware, firmware, and/or software needed to run an entire device. The SoC 600 can also include an integrated data bus that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 600 can also be implemented with many combinations of differing components.

In this example, SoC 600 includes various components such as an input-output (I/O) logic control 602 (e.g., to include electronic circuitry, generally) and a microprocessor 604 (e.g., any of a microcontroller, digital signal processor, etc.). The SoC 600 also includes a memory 606, which can be any type of random access memory (RAM), a low-latency nonvolatile memory (e.g., flash memory), read only memory (ROM), and/or other suitable electronic data storage. The SoC 600 can also include various firmware and/or software, such as an operating system 608, which can be computer-executable instructions maintained by memory 606 and executed by microprocessor 604. The SoC 600 can also include other various communication interfaces and components, wireless LAN (WLAN) components, other hardware, firmware, and/or software.

In this example, SoC 600 may include assistor communication module 118 and BIOS assistance module 120. Examples of these various components, functions, and/or modules, and their corresponding functionality, are described with reference to the respective components of the example environment 100 shown in FIG. 1.

The BIOS assistance module in SoC 600, either independently or in combination, can be implemented as computer-executable instructions maintained by memory 606 and executed by microprocessor 604 to implement various embodiments and/or features of the tools. The BIOS assistance module may also be provided as a service apart from SoC 600. Alternatively and/or in addition, the communication module and the BIOS assistance module can be implemented as hardware, firmware, fixed logic circuitry, or any combination thereof that is implemented in connection with the I/O logic control 602 and/or other signal processing and control circuits of SoC 600.

Current BIOS have significant resource limitations. These limitations may make it difficult to do even moderately complex operations or those having small memory requirements when using the resources of the BIOS. This document describes tools that offload some tasks from a host BIOS to a remote entity. By so doing, the tools permit the BIOS to conserve its limited resources and/or permit complex or memory-intensive tasks and functions that would otherwise be difficult or impossible for some traditional BIOS. These tools may include an assistor, which enables a BIOS to complete tasks using fewer memory or processing resources or enables the BIOS to handle tasks that require additional memory or processing resources without taxing the BIOS resources.

Although the subject matter has been described in language specific to structural features and/or methodological steps, it is to be understood that the subject matter defined in the appended claims is not necessarily limited to the specific features or acts described above. Rather, the specific features and acts described above are disclosed as example forms of implementing the claims.

What is claimed is:

1. An apparatus for assisting a Basic Input/Output System (BIOS), the apparatus comprising:
   one or more microprocessors:
   one or more computer-readable media comprising processor executable instructions that, responsive to execution by the one or more microprocessors, implement a BIOS assistance module to:
   pass user interface instructions to a host BIOS effective to enable the host BIOS to present a user interface;
   receive, via the user interface presented by the host BIOS, wrapped user input selecting one or more tasks for the host BIOS to perform, the one or more tasks necessitating a change to the user interface presented by the host BIOS;
   perform one or more operations to further completion of the one or more tasks selected for the host BIOS to perform, the one or more operations comprising providing instructions usable by the host BIOS to alter the user interface or create another user interface;
   and pass results of the one or more operations to the host BIOS effective to enable the host BIOS to perform the one or more tasks selected for the host BIOS.

2. The apparatus of claim 1, wherein the BIOS assistance module is further configured to construct one or more of the user interface instructions that enable the host BIOS to present the user interface.

3. The apparatus of claim 2, wherein to construct the user interface instructions, the BIOS assistance module is configured to compile information about a computing device on which the host BIOS operates, the compiled information associated with graphical hardware components of the computing device, the graphical hardware components operable to present the user interface based on the user interface instructions.

4. The apparatus of claim 1, wherein passing the results of the one or more operations is effective to enable the host BIOS to perform the one or more tasks using fewer memory or processing resources than if the host BIOS performed the one or more tasks without having the results provided by the BIOS assistance module.

5. The apparatus of claim 1, wherein the wrapped user input operations comprises a text character received via the user interface.

6. The apparatus of claim 1, wherein the one or more operations performed by the BIOS assistance module to further completion of the one or more tasks comprising constructing BIOS Boot Specification (BBS) PnP (Plug-And-Play) headers or parsing register definitions of INT13h functions and translating these register definitions into predefined message payloads.

7. A method comprising:
   presenting, via a host Basic Input/Output System (BIOS), a user interface based on user interface instructions received from an entity remote from the host BIOS;
   passing, to the remote entity, user input received via the user interface presented by the host BIOS as wrapped user input;
   receiving, from the remote entity, other instructions based on the wrapped user input and sufficient to enable the host BIOS to alter the user interface based on the other instructions; and altering, based on the other instructions, the user interface presented via the host BIOS.

8. The method of claim 7, wherein the user interface instructions permit the host BIOS to present the user interface without the host BIOS having to determine, for a computing device on which the host BIOS operates, information associated with graphical hardware components of the computing device.

9. The method of claim 7 further comprising, prior to passing the user input to the remote entity, wrapping the user input to provide the wrapped user input.

10. The method of claim 7, wherein the act of presenting the user interface and the act of altering the user interface are performed by the host BIOS acting as a dummy terminal.

11. The method of claim 7, further comprising:
   receiving second user input through the altered user interface;
   passing the second user input to the remote entity; and
   receiving second other instructions from the remote entity, the second other instructions based on the second user input and sufficient to enable the host BIOS to perform a task using fewer memory or processing resources than if the host BIOS performed the task without having the second other instructions.

12. The method of claim 11, wherein the second other instructions are results of performing an operation required to complete the task performed by the host BIOS.

13. The method of claim 12, wherein the operation comprises constructing BIOS Boot Specification (BBS) PnP (Plug-And-Play) headers or parsing register definitions of INT13h functions and translating these register definitions into predefined message payloads.

14. One or more computer-readable hardware storage devices comprising processor-executable instructions that, responsive to execution by a processor, implement a Basic Input/Output System (BIOS) assistance module to:
   pass user interface instructions to a host Basic Input/Output System (BIOS) effective to enable the host BIOS to present a user interface;
   receive, via the user interface presented by the host BIOS, wrapped user input selecting a task for the host BIOS to perform, the task necessitating a change to the user interface presented by the host BIOS;
   performing one or more operations to further completion of the task selected for the host BIOS to perform, the one or more operations comprising providing instructions usable by the host BIOS to alter the user interface or create another user interface; and
   passing results of the one or more operations to the host BIOS effective to enable the host BIOS to perform the task selected for the host BIOS.

15. The one or more computer-readable hardware storage devices of claim 14, comprising additional processor-executable instructions that, responsive to execution by the processor, implement the BIOS assistance module to construct one or more of the user interface instructions that enable the host BIOS to present the user interface.

16. The one or more computer-readable hardware storage devices of claim 14, wherein the processor-executable instructions are executed as firmware of a computing device on which the host BIOS operates.

17. The one or more computer-readable hardware storage devices of claim 14, wherein passing the results of the one or more operations to the host BIOS is effective to enable the host BIOS to perform the task selected for the host BIOS using fewer memory or processing resources than if the host BIOS performed the task without having the results.

18. The one or more computer-readable hardware storage devices of claim 14, wherein the one or more operations performed to further completion of the task include constructing BIOS Boot Specification (BBS) PnP (Plug-And-Play) headers or parsing register definitions of INT13h functions and translating these register definitions into predefined message payloads.

19. The one or more computer-readable hardware storage devices of claim 18, wherein the results of performing the one or more operations are passed to the host BIOS using x86 registers.

20. The one or more computer-readable hardware storage devices of claim 14, wherein the act of presenting the user interface is performed by the host BIOS acting as a dummy terminal.

* * * * *